M. SAUNDERS.
VARIABLE SPEED GEARING.
APPLICATION FILED NOV. 1, 1912.

1,065,553.

Patented June 24, 1913.

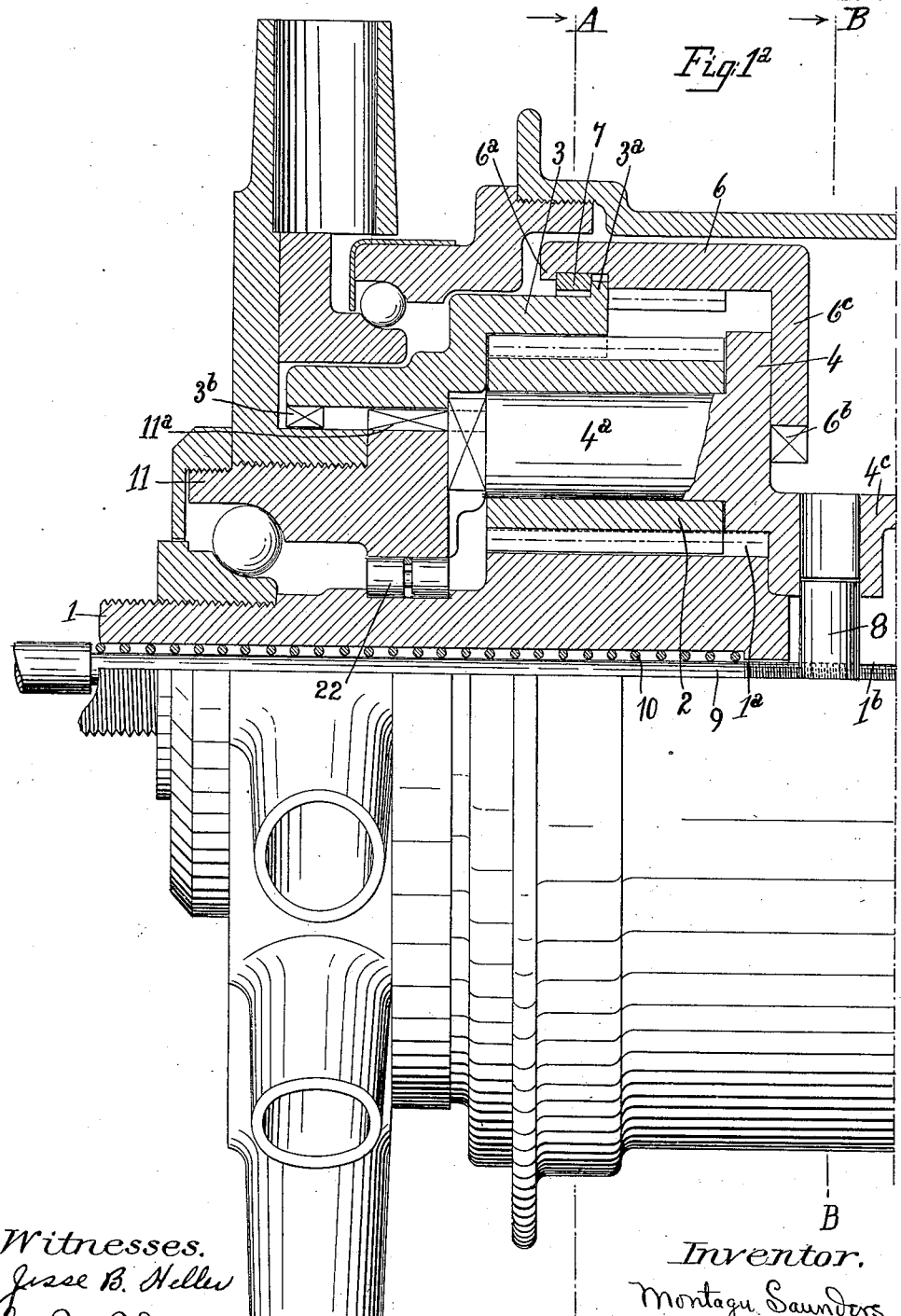

M. SAUNDERS.
VARIABLE SPEED GEARING.
APPLICATION FILED NOV. 1, 1912.

1,065,553.

Patented June 24, 1913.

3 SHEETS—SHEET 3.

Witnesses.
Jesse B. Heller
J. B. Bleining

Inventor.
Montagu Saunders,
by Bakewell, Byrnes Parmelee,
Attys

UNITED STATES PATENT OFFICE.

MONTAGU SAUNDERS, OF ST. JOHN'S WOOD, LONDON, ENGLAND.

VARIABLE-SPEED GEARING.

1,065,553.  Specification of Letters Patent.  Patented June 24, 1913.

Application filed November 1, 1912. Serial No. 729,017.

*To all whom it may concern:*

Be it known that I, MONTAGU SAUNDERS, subject of the King of England, residing at 67 Springfield road, St. John's Wood, London, England, have invented new and useful Improvements in Variable - Speed Gearing, of which the following is a specification.

My invention relates to improvements in variable-speed gears for motor cycles, more particularly to the type in which three speeds can be obtained at will, the highest speed being produced when the driving and driven members rotate at the same angular velocity.

By my invention, power is transmitted from the driving to the driven member on the highest speed without passing through the gear-wheels which are employed for producing the intermediate and lowest speeds, whereby frictional losses are avoided on the highest speed, which is most frequently in use, and such speed is rendered independent of the gear-trains and can be used notwithstanding that such trains be damaged.

Further objects of my invention are to obviate the utilization of the teeth of any of the gear-wheels as clutch teeth, whereby they are likely to be damaged, to employ gear-changing mechanism of sufficient size to be strong and yet not so large as to affect injuriously the operation of gear-changing, and to support the various members of the mechanism efficiently without interfering with easy adjustability.

By my invention, I produce a gear of considerable strength and easy manipulation, which is not liable to be damaged in use, and reduces frictional losses on the speed mostly used, namely, the highest. The construction I adopt also admits of combination with pedaling gear and a driving clutch such that the engine may be started while the cycle remains stationary, or the wheel may be rotated by the pedaling gear if the engine fails, or the pedaling gear may be utilized as auxiliary to the engine, or may be quiescent.

Figure 1:
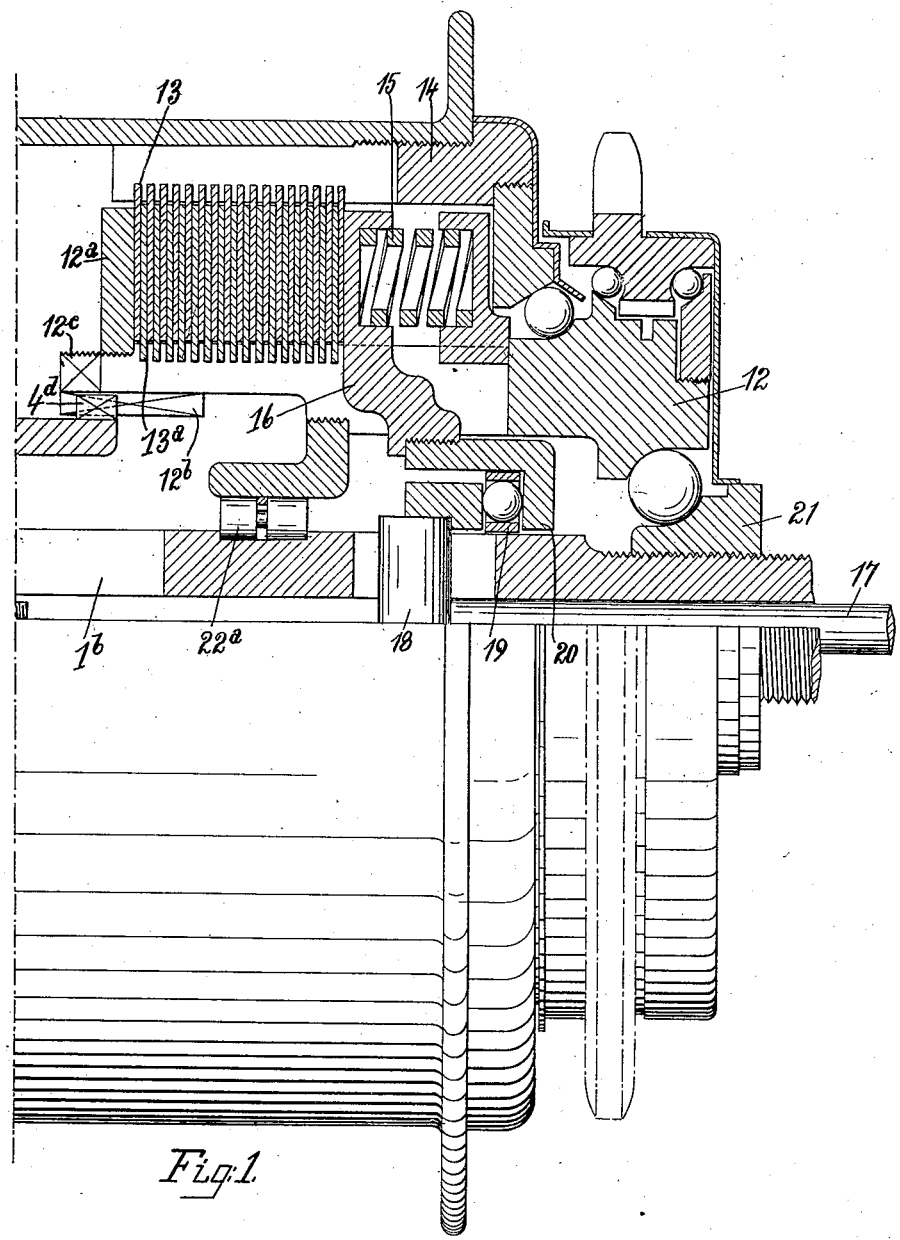
Figure 2:
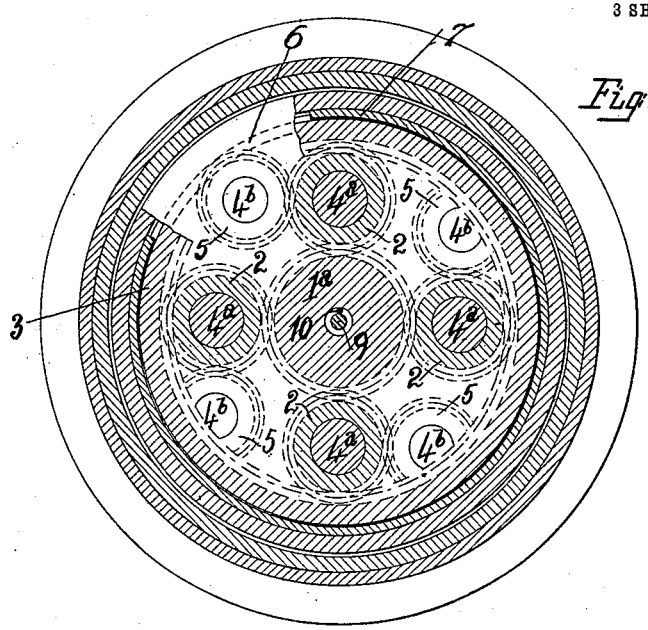
Figure 3:
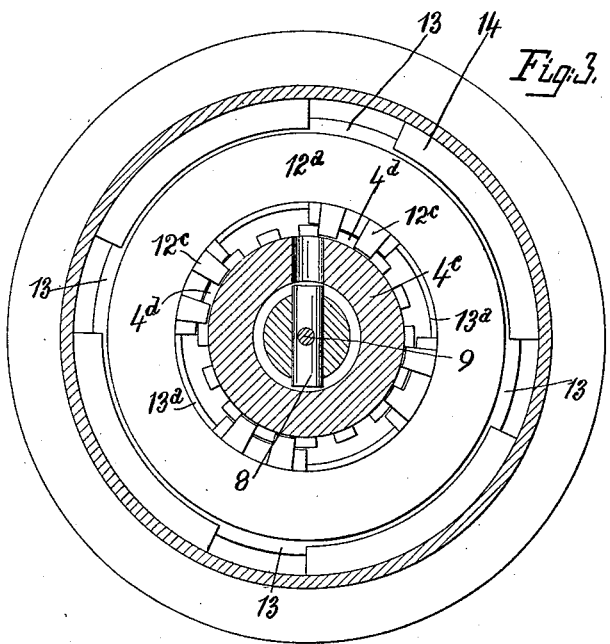

In the drawings, Figures 1 and $1^a$ represent a longitudinal half-section of a gear made in accordance with my invention, as applied to the hub of the road-wheel. Fig. 2 is a cross-section on the line A—A, looking in the direction of the arrow. Fig. 3 is a cross-section on the line B—B, looking in the direction of the arrow.

Similar numerals refer to similar parts in all the figures.

In carrying my invention into effect in the application exemplified in the drawings, I employ a non-rotatable arbor or spindle, 1, upon which I form or rigidly fix a sun-wheel, $1^a$, of suitable dimensions, according to the variations of speed desired to be produced. One or more planet-pinions, 2, mesh with this sun-wheel, and also with an internally-toothed annulus, 3, and such planet-pinions are mounted upon studs, $4^a$, on a disk or the like, 4, in such manner as to be capable of rotating freely on said studs. The disk 4 is also provided with a second set of studs, $4^b$, upon which are freely mounted a second set of planets, 5, in such manner that they mesh with the first set, 2, planet with planet, but not with the annulus, 3, or the sun-wheel. For this purpose, the planets 5 may be made shorter than the planets 2, and their studs $4^b$ may be at a greater radius than the studs $4^a$ from the central axis of the mechanism. A second internally-toothed annulus, 6, is also provided, which meshes with the planets 5, but not with the planets 2, and I also provide means whereby the disk 4, together with the planets 2 and 5, as also the annuli 3 and 6, may be moved laterally, but so that the planets 2 are never taken out of mesh with the sun-wheel. This may be accomplished by any suitable means, for instance, the annuli may overlap, and be provided with collars, $3^a$ and $6^a$, between which is inserted a split ring, 7, which permits the annuli to rotate independently but obliges them to move laterally together, while between them are confined the disk 4 and the planets 2 and 5. A sleeve, $4^c$, on the disk 4, is formed with an internal groove, into which take the ends of the key or cross-pin, 8, adapted to be moved laterally in the slot, $1^b$, in the arbor, 1, by any suitable means, such as the push-rod, 9, and the return-spring, 10.

The driving member, 11, to which the engine transmits power by any suitable means, is provided with keys, $11^a$, or the like, upon its periphery, and (in the embodiment of my invention illustrated in the drawings) with a second set of teeth, keys, dogs, or the like, upon its inner face, adapted to be engaged by similar parts rigidly connected with the member 4; as illustrated in Fig. $1^a$, the ends of the studs 4ᵃ are adapted to take into the face-slots of the driving member 11, but I may employ other suitable means of engagement.

The annulus 3 is provided with keys or the like, 3ᵇ, adapted to engage with the keys 11ᵃ, and the arrangement of the parts is such, that when the annulus 3 is connected with the driving member 11 by reason of the engagement of the said keys, the disk 4 is free from the driving member, and vice versa.

At the side of the disk 4 remote from the driving member, I provide a driven member, 12, which may conveniently be in the form of a sleeve, and upon the farther end of this sleeve may be mounted or formed one or more parts of a free-wheel sprocket, as indicated in Fig. 1. Upon that part of the driven member which is nearer the disk 4, may be mounted one or more parts of a frictional or other driving clutch, the corresponding parts of which, in the case when the gear is contained within the hub of the road-wheel, are suitably connected with such hub. If preferred, the driven member 12 may be rigidly attached to or connected with the hub or other part to be driven. The driving-clutch, if embodied in my gear, may conveniently be of the type known as "multiple-disk," and I have so shown it in the drawings, where the tongues of two series of disks or plates, 13 and 13ᵃ, respectively engage in slots in the hub-barrel, 14, and driven member, 12; said plates are compressed by springs, 15, between the movable disk 16, and the fixed plate 12ᵃ, rigidly attached to the driven member 12. The disks are freed, and the clutch rendered inoperative for transmitting power, by withdrawing the drawrod, 17, attached to the crosspin, 18, whereby, through the thrust-washer, 19, and cup, 20, the plate 16 is withdrawn against the action of the springs 15. By the arrangement described, the thrust exerted by the springs 15 is resisted by or contained within the clutch parts, when power is being transmitted by the clutch, and is not transferred to the bearings, and by this arrangement frictional running losses are reduced.

The driven member, 12, is provided at its inner end with keys or the like, 12ᵇ, which are adapted to be engaged by similar keys, 4ᵈ, on the sleeve, 4ᶜ, of the disk, 4; face-dogs or teeth, 12ᶜ, are also formed upon the driven member 12, and are adapted to be engaged by teeth or the like, 6ᵇ, upon the disk, 6ᶜ, attached to the annulus 6. The arrangement of the parts is such, that when the annulus 6 is connected with the driven member 12 by the engagement of their respective teeth, the disk 4 is free from the driven member, and vice versa.

All rotating parts are preferably mounted upon suitable anti-friction bearings, as shown, and, in order to support the mechanism efficiently without interfering with the easy adjustment of the bearings, and also to facilitate engagement of the gear-changing clutches, I prefer to support the inner ends of the driving and driven members upon anti-friction bearings interposed between them and the arbor, these bearings being, however, of such a nature as to permit of the simultaneous adjustment of the main bearings between the arbor and the driving and driven sleeves, and of the secondary bearings between these latter and the hub, by the movement of one cone, such as 21, of the main bearings. The rollers 22 and 22ᵃ, shown in Figs. 1 and 1ᵃ serve this purpose, but they may be replaced by balls or the like.

The action of the gearing is as follows:— When the disk 4 is in the position shown in Fig. 1, the ends of the studs 4ᵃ engage with the corresponding face-slots of the driver 11, and power is then transmitted from the latter through the disk 4 to the driven member 12, by reason of the engagement of the keys 4ᵈ with the keys 12ᵇ; in this position the planets and annuli rotate idly. Upon lateral movement of the disk 4 a short distance to the right, the keys 3ᵇ on the annulus 3 engage the keys 11ᵃ upon the periphery of the driving member 11, while the studs 4ᵃ disengage therefrom, but the keys 4ᵈ still remain in engagement with the keys 12ᵇ; the disk 4 is now rotated at a lower angular velocity than the driving member 11, by reason of the free rotation of the planets 2 on the studs 4ᵃ, and such lower rate of rotation is transmitted to the driven member 12 by reason of the engagement of the keys 4ᵈ and 12ᵇ, the annulus 6 and the planets 5 meanwhile rotating idly. Finally, when the disk 4 is moved laterally to its farthest position to the right, the keys 3ᵇ and 11ᵃ still remain in engagement, but the keys 4ᵈ disengage from the keys 12ᵇ, and the teeth 6ᵇ on the annulus 6 engage the teeth 12ᶜ on the driven member 12. While, therefore, the disk 4 still continues to be rotated at a lower angular velocity than the driven member 11, power is now transmitted to the driven member through the annulus 6, which, by reason of the intermeshing of the planets 2 and 5, is rotated at a lower angular velocity than the disk 4. In every case the angular velocity imparted to the driven member 12 is transmitted to the hub or other ultimate driven member by means of the connection between them, whether it be a driving-clutch, as shown, or a rigid or permanent connection, but if a driving-clutch be used, it is plain that the road-wheel can be freed from the engine whenever it is required to disconnect them, and also that by disengaging the driving-clutch, the engine can be started by the foot-pedals through the sprocket mounted upon the driven member 12. Further, by so proportioning the distances between the sets of keys that the keys 4ᵈ are disengaged from the keys 12ᵇ well before the teeth 6ᵇ engage the teeth 12ᶜ, a position can be given to the parts of the mechanism wherein the hub can be driven by the foot-pedals through the free-wheel sprocket, without any angular rotation being imparted to the driving member 11 or the engine, while finally the pedaling gear may either be left quiescent, or utilized to assist the engine.

It will be seen that by my invention, I am enabled to employ a fixed sun-wheel, and to provide separate clutches for effecting the speed-changes, in lieu of utilizing the teeth of any of the gear-wheels as clutch-members. At the same time the gear-changing clutches are enabled to be disposed approximately midway between the central axis of the mechanism and the periphery of the annuli, so that while they may be at such a radius from the central axis as to permit of their being made sufficiently, robust, they may nevertheless be near enough to it to allow of their easy and rapid engagement at all times, by reason of their relatively low speed of rotation.

I desire to state that in carrying out my invention, various changes may be made without departing from the spirit or scope thereof.

What I claim and desire to secure by Letters Patent of the United States is:—

1. In a three-speed gearing for motor cycles and the like, a driving member, a driven member surrounding the driving member, epicylic gear-trains interposed between them whereby the driving member can rotate the driven member at either of two rates of angular velocity lower than its own angular velocity, a coupling member also interposed between them whereby the driving member can rotate the driven member at its own angular velocity independently of said gear-trains, and means for connecting the driving member with the driven member either by said coupling or by said gear-trains.

2. In three-speed gearing for motor cycles and the like, a driving member, a driven member surrounding the driving member, a coupling member interposed between them whereby they may be coupled so as to rotate at the same speed, epicyclic gear-trains interposed between them whereby the driven member will rotate at either of two different speeds of rotation both of which are lower than the speed of rotation of the driving member, and means for effecting the variations of speed between the driving and driven members.

3. In a three-speed gearing for motor cycles and the like, a driving member, a driven member surrounding the driving member, an axially-movable member interposed between said driving and driven members for coupling them so that they will rotate at the same angular velocity, epicyclic gear-trains also interposed between said driving and driven members for connecting them so that the driving member will rotate at either of two different rates of angular velocity both higher than that of the driven member, and means for effecting the several speed variations.

4. In a three-speed gearing for motor cycles and the like, a driving member, a driven member, an axially-movable coupling member interposed between them, a stationary arbor, a sun-wheel thereon, a set of planet-pinions meshing therewith, an internally-toothed annulus meshing with said pinions, a second set of planet-pinions meshing with the first set, a second internally-toothed annulus meshing with said first set, means for connecting said first-mentioned annulus with the driving member and said second-mentioned annulus with the driven member, and means for moving the parts so as to effect the several speed variations.

5. In a three-speed gearing of the kind described, a driving member, a driven member, an interposed axially-movable coupling member having pins for planet-pinions on one side thereof and a sleeve on the other side thereof, a set of planet-pinions mounted freely on some of said pins, a stationary sun-wheel meshing with said planets, an internally-toothed annulus also meshing with said planets, other planets mounted freely on the other pins on said coupling member and meshing with first-mentioned planets and a second internally-toothed annulus, means for connecting the driving and driven members to the coupling member, other means for connecting first-mentioned annulus to the driving member and second annulus to the driven member, and means for operating said connections.

6. In a three-speed gearing of the kind described, a driving member, a driven member, an interposed coupling member, a stationary sun-wheel, two internally toothed annuli intermeshing planet-pinions of which one set meshes with said sun-wheel and one annulus, and the other set with the second annulus, and means for disconnecting said annuli from the driving and driven members respectively when the latter are coupled by the coupling member, for coupling said first annulus to the driving member when the driven member is coupled to the coupling member, and for coupling the second annulus to the driven member when the first annulus is coupled to the driving member.

7. In a three-speed gearing of the kind described, driving and driven members, an interposed coupling member, intermeshing planet-pinions thereon, a stationary sun-wheel meshing with one set of planets, an annulus also meshing with said set of planets, a second annulus meshing with the other set of planets, operating means for effecting the variations of speed between the driving and driven members, a rotatable shell, a driving clutch mounted between said shell and the driven member, and means for rendering said clutch operative or inoperative for transmitting power.

8. In a three-speed gearing of the kind described, driving and driven members, an interposed coupling member, intermeshing planet-pinions mounted thereon, a non-rotating sun-wheel meshing with one set of said planets, annuli meshing each with one set of planets, operating means for effecting the several variations of speed between the driving and driven members, and anti-friction bearings supporting each of said driving and driven members in two axially-separated planes.

9. In a three-speed gearing of the kind described, driving and driven members, anti-friction bearings supporting each of same in two axially-separated planes, an interposed coupling member, intermeshing planet-pinions freely mounted thereon, a non-rotatable sun-wheel meshing with one set of said planets, annuli meshing each with one set of planets, operating means for effecting the speed variations of the driving and driven members, a rotatable shell, a driving clutch mounted between said shell and the driven member, means for rendering said clutch operative or inoperative for transmitting power, a free-wheel sprocket mounted on said driven member, and means for disconnecting the driven member from the driving member.

In testimony whereof I have signed my name to this specification in the presence of two subscribing witnesses.

MONTAGU SAUNDERS.

Witnesses:
HOWARD C. ELLIOTT,
O. J. WORTH.

---

Copies of this patent may be obtained for five cents each, by addressing the "Commissioner of Patents, Washington, D. C."